US012306612B2

(12) United States Patent
Brockman et al.

(10) Patent No.: US 12,306,612 B2
(45) Date of Patent: *May 20, 2025

(54) OPTIMIZING MANUFACTURING OF PHYSICAL COMPONENTS

(71) Applicant: STARBUCKS CORPORATION, Seattle, WA (US)

(72) Inventors: John Lawrence Brockman, Edmonds, WA (US); Susan P. Behroozi, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 528 days.

This patent is subject to a terminal disclaimer.

(21) Appl. No.: 17/897,825

(22) Filed: Aug. 29, 2022

(65) Prior Publication Data

US 2024/0069523 A1 Feb. 29, 2024

(51) Int. Cl.
  *G05B 19/4155* (2006.01)

(52) U.S. Cl.
  CPC ........... *G05B 19/4155* (2013.01); *G05B 2219/36301* (2013.01)

(58) Field of Classification Search
  CPC ...... G05B 19/4155; G05B 2219/36301; G05B 19/418; G05B 2219/32015
  See application file for complete search history.

(56) References Cited

U.S. PATENT DOCUMENTS

| 5,630,070 A | 5/1997 | Dietrich et al. |
| 6,446,053 B1 | 9/2002 | Elliott |
| 11,733,661 B1 | 8/2023 | Brockman et al. |
| 11,741,377 B2 * | 8/2023 | Li .................. G06N 5/02 706/46 |
| 11,796,969 B1 | 10/2023 | Brockman et al. |
| 2001/0020230 A1 | 9/2001 | Kaneko et al. |

(Continued)

FOREIGN PATENT DOCUMENTS

| DE | 102010038090 A1 | 4/2012 |
| EP | 3444773 A1 | 2/2019 |
| WO | 2022133330 A1 | 6/2022 |

OTHER PUBLICATIONS

PCT/US2023/029800; International Search Report and Written Opion dated Nov. 16, 2023, 16 pages.
PCT/US2023/029800, "International Search Report and Written Opinion", dated Nov. 16, 2023, 14 pages.
U.S. Appl. No. 18/130,210, "Notice of Allowance", dated Jun. 23, 2023, 15 pages.
U.S. Appl. No. 18/214,574, "Non-Final Office Action", dated Aug. 28, 2023, 33 pages.
U.S. Appl. No. 18/214,574, "Notice of Allowance", daed Sep. 13, 2023, 11 pages.

(Continued)

*Primary Examiner* — Mohammad Ali
*Assistant Examiner* — Sheela Rao
(74) *Attorney, Agent, or Firm* — Kilpatrick Townsend & Stockton LLP (57) ABSTRACT

A manufacturing process for physical components can be optimized using some techniques described herein. For example, a system can access a group of models, where each model corresponds to a respective type of production location. The system can select a model, from the group of models, that corresponds to a particular type of production location selected by a user. The system can select a particular type of production equipment based on the selected model. The system can then execute one or more computing operations to facilitate deployment of the particular type of production equipment at the particular type of production location. This can help ensure that appropriately sized production equipment is installed at the production location.

17 Claims, 5 Drawing Sheets

(56) References Cited

U.S. PATENT DOCUMENTS

| | | |
|---|---|---|
| 2002/0188495 A1 | 12/2002 | Banerjee et al. |
| 2003/0229550 A1 | 12/2003 | DiPrima et al. |
| 2004/0017041 A1 | 6/2004 | Broadbent et al. |
| 2004/0117041 A1 | 6/2004 | Broadbent et al. |
| 2006/0286235 A1 | 12/2006 | Kleinschnitz et al. |
| 2010/0121678 A1 | 5/2010 | McCormick |
| 2018/0245833 A1 | 8/2018 | Brewer et al. |
| 2020/0006944 A1* | 1/2020 | Fife .................. H02J 3/004 |
| 2021/0123771 A1* | 4/2021 | Vega .................. H04Q 9/00 |
| 2021/0135937 A1 | 5/2021 | Huang |
| 2022/0318740 A1 | 10/2022 | Lee et al. |

OTHER PUBLICATIONS

EasyIce, "7 Things to Consider When Choosing the Best Ice Machine for Your Business", (https://web.archive.org/web/20201230160148/https://www.easyice.com/category/ice-machines-101/), pp. 2-8, May, 2019.

Radatz et al., "Design of Equipment Modules for Flexibility", Chemical Engineering Science, Apr. 2017, pp. 271-274.

PCT/US2023/029800, "International Preliminary Report on Patentability", dated Mar. 13, 2025, 10 pages.

\* cited by examiner

OPTIMIZING MANUFACTURING OF PHYSICAL COMPONENTS

TECHNICAL FIELD

The present disclosure relates generally to optimizing manufacturing. More specifically, but not by way of limitation, this disclosure relates to optimizing manufacturing of physical components at production locations using models.

BACKGROUND

A production location can be any location that manufactures (e.g., produces or assembles) one or more types of physical products. Examples of a production location can include a manufacturing facility or a store. The physical products can include a particular component, such as an ingredient, an integrated-circuit chip, or a mechanical fastener. If the production location also manufactures the particular component on-site, the production location can include production equipment for use in manufacturing the particular component. For example, the production location may include first production equipment usable to manufacture the particular component and second production equipment usable to manufacture a physical product that includes the particular component. Different types of physical products may require different amounts of the particular component. For example, one type of product may require more of the particular component than another. Because different production locations may produce different types or quantities of physical products over the same time period, different production locations may require different amounts of the particular component during that time period.

SUMMARY

One example of the present disclosure includes a system comprising one or more processors and one or more memories. The one or more memories can include instructions that are executable by the one or more processors to: access a plurality of models stored in memory, each model of the plurality of models corresponding to a respective type of production location among a plurality of types of production locations and indicating consumption rates of a component over a particular time window at the respective type of production location; select a particular model, from among the plurality of models, that is associated with a particular type of production location selected by a user; select a particular type of production equipment, from among a plurality of candidate types of the production equipment, based on the particular model; and execute one or more computing operations configured to facilitate deployment of the particular type of production equipment at the particular type of production location.

Another example of the present disclosure includes a method involving accessing a plurality of models stored in memory, each model of the plurality of models corresponding to a respective type of production location among a plurality of types of production locations and indicating consumption rates of a component over a particular time window at the respective type of production location; selecting, by the one or more processors, a particular model, from among the plurality of models, that is associated with a particular type of production location selected by a user; selecting, based on the particular model, a particular type of production equipment, from among a plurality of candidate types of the production equipment; and executing one or more computing operations configured to facilitate deployment of the particular type of production equipment at the particular type of production location. Some or all of these operations can be performed by one or more processors.

Still another example of the present disclosure includes a non-transitory computer-readable medium including program code that is executable by one or more processors for causing the one or more processors to: access a plurality of models stored in memory, each model of the plurality of models corresponding to a respective type of production location among a plurality of types of production locations and indicating consumption rates of a component over a particular time window at the respective type of production location; select a particular model, from among the plurality of models, that is associated with a particular type of production location selected by a user; select a particular type of production equipment, from among a plurality of candidate types of the production equipment, based on the particular model; and execute one or more computing operations configured to facilitate deployment of the particular type of production equipment at the particular type of production location.

Yet another example of the present disclosure includes a system comprising one or more processors and one or more memories. The one or more memories can include instructions that are executable by the one or more processors to: access a plurality of models stored in memory, each model of the plurality of models corresponding to a respective type of production location among a plurality of types of production locations and indicating cumulative consumption of a component over a particular time window at the respective type of production location, the component being part of a plurality of physical products manufactured at the plurality of types of production locations; determine a particular model of the plurality of models that is associated with a particular type of production location selected by a user, the particular model being usable to determine a maximum consumption rate of the component at the particular type of production location; select a particular type of production equipment, from among a plurality of candidate types of the production equipment, that is configured to accommodate the maximum consumption rate of the component; and execute one or more computing operations configured to facilitate deployment of the particular type of production equipment at the particular type of production location.

DETAILED DESCRIPTION

Certain aspects and features of the present disclosure relate to optimization software that can optimize a manufacturing process for a physical component at different types of production locations using models. For example, the optimization software can generate a set of models corresponding to different types of production locations. Each model can correspond to a particular type of production location and indicate the cumulative consumption of the component over a predesignated time window at that particular type of production location. Based on the models, the optimization software can determine a maximum consumption rate of the component at a particular type of production location. The optimization software can then select a piece of production equipment that is sized or otherwise configured to produce the component at least as fast as the maximum consumption rate. After selecting an appropriate piece of production equipment, the optimization software can facilitate the physical installation of the production equipment at the particular type of production location by one or more entities.

It can be desirable to appropriately size production equipment for a given type of production location. Correctly sizing the production equipment can prevent the production location from overproducing or underproducing a component, which can help to optimize output from the production location. Underproducing the component may lead to an inability to fulfill demand for physical products that include the component. Conversely, overproducing the component may lead to waste and excess energy consumption. This is particularly true if the component is subject to rapid degradation (e.g., if the component is ice that melts), where any excess may quickly become unusable. But it can be challenging to correctly size production equipment for a given type of production location. Previous approaches to sizing production equipment largely involve relying on a human expert to determine whether they think a certain piece of production equipment will satisfy the needs of a given production location. This approach is fraught with error because it is largely subjective and complex. While there are also some computer-based approaches, they can be computationally intensive, location specific, and inaccurate due to the exclusion of key variables. These computer-based approaches also tend to consume significant amounts of computing resources such as processing power, memory, and storage space.

Some examples of the present disclosure can overcome one or more of the abovementioned problems by providing optimization software that uses computationally efficient models to automatically select an appropriate piece of production equipment for a given type of production location. The models can be specifically designed to consume fewer computing resources (e.g., CPU, memory, and storage space) and provide more accurate results than alternative approaches. One example of such a model can be a third order polynomial, which requires a trivial amount of storage space and can be rapidly configured by optimizing just four coefficients, while still providing accurate results. Such models are also faster to generate and require fewer computing resources to use than alternative approaches, which can reduce latency and improve the responsiveness of the optimization software. The optimization software can rely on such models to quickly, efficiently, and accurately evaluate a particular type of production location and select an appropriately sized piece of production equipment. After selecting a piece of production equipment, the optimization software can execute one or more computing operations to facilitate the physical installation of the selected production equipment at a production location.

In some examples, the optimization software can also automatically control the operation of a piece of production equipment at a production location based on the models. This automation may assist in conserving energy, minimizing waste, and optimizing output. For example, the optimization software can analyze a model to determine that a component is consumed at different rates throughout the day at a particular type of production location. For instance, the production location may produce more physical products with the component in the morning than in the afternoon, so the component may be used at a higher rate in the morning than in the afternoon. In this scenario, it may be desirable to control the production equipment to operate at a higher production rate in the morning and a lower production rate in the afternoon. So, the optimization software can automatically transmit control signals to the production equipment for causing the production equipment to operate at the higher production rate in the morning and the lower production rate in the afternoon. This can improve efficiency. Operating at the higher production rate may produce more of the component and consume more electrical energy, while operating at the lower production rate may produce less of the component and consume less electrical energy, so adjusting the production rate throughout the day can balance production output against energy consumption.

Additionally or alternatively, the optimization software can control the operation of secondary production equipment based on the models. For instance, in the above example, the optimization software could automatically control the production rate for a piece of production equipment based on the models. But, it may not always be possible to control a primary piece of production equipment in this manner. Older production equipment that has already been installed at various locations may not have this capability and may be unable to produce enough of the component at peak times. In some such situations, secondary production equipment can be installed at the production location and used to cure the deficiency in component production. The secondary production equipment may be physically smaller than the primary production equipment. The secondary production equipment may also produce less output and consume less energy than the primary production equipment. After the secondary production equipment is installed at the production location, the optimization software can automatically control the secondary production equipment, for example by changing its rate of production throughout the day. This may help to optimize output and reduce energy consumption.

In some examples, the optimization software can automatically control both of the primary production equipment and the secondary production equipment based on the models. For example, the primary production equipment may be unable to produce enough of the component at peak times, though it may be capable of being automatically controlled by the optimization software. In some such situations, secondary production equipment can be installed at the production location and used to cure the deficiency in component production. Once the secondary production equipment is installed at the production location, the optimization software can automatically control both the primary production equipment and the secondary production equipment, for example by changing their production rates throughout the day so that they can cooperate to meet production requirements. The primary production may be used a majority of the time, with the secondary production equipment being awoken from an idle state or otherwise operated at peak times to meet any excess need.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
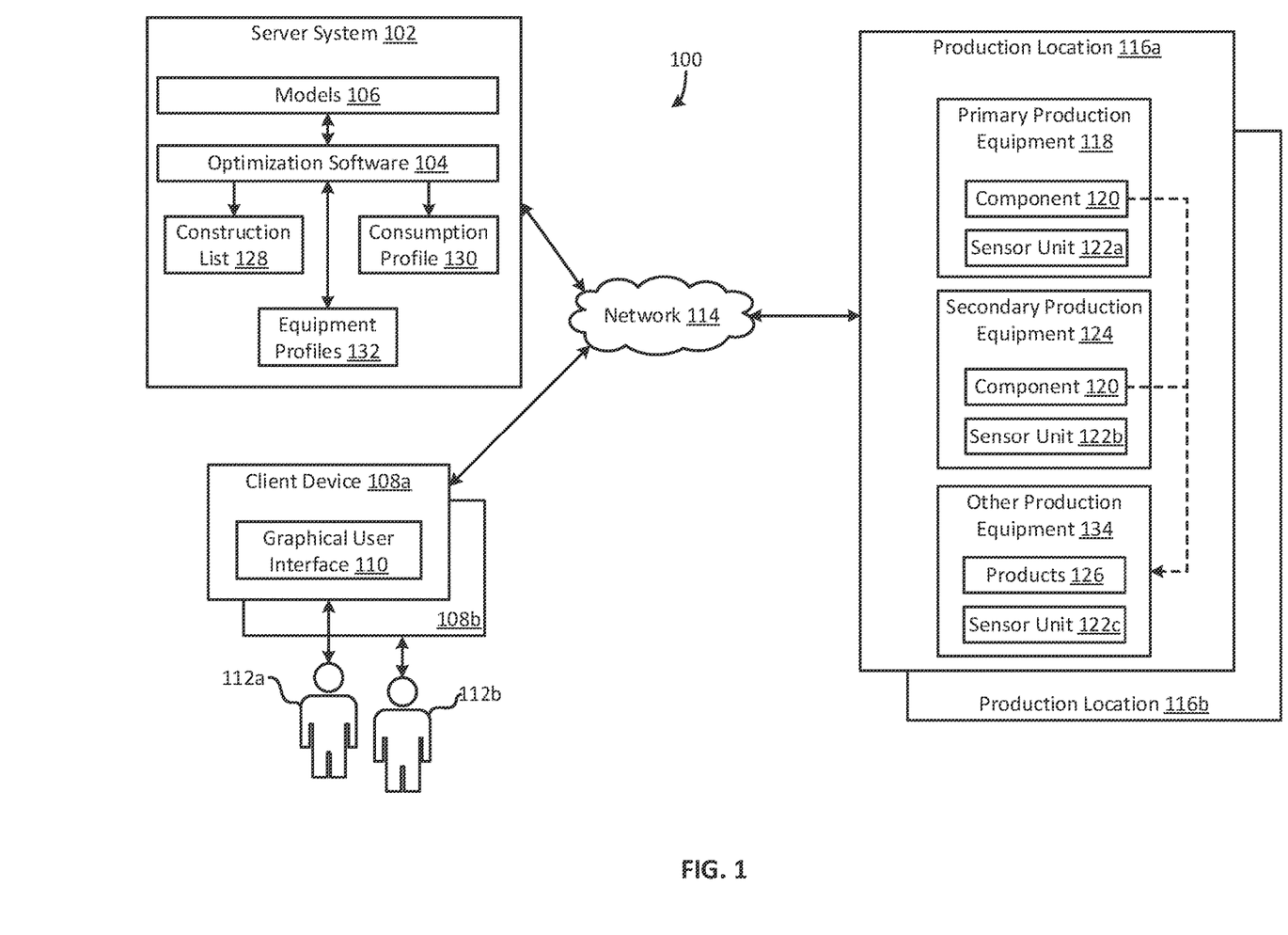
FIG. 1 is a block diagram of an example of a system for optimizing manufacturing of physical components at production locations according to some aspects of the present disclosure.

FIG. 1 is a block diagram of an example of a system 100 for optimizing manufacturing of physical components at production locations 116a-b according to some aspects of the present disclosure. The system 100 includes a server system 102. The server system 102 can include one or more computing devices that may or may not be in a distributed configuration, such as in a cloud computing arrangement. The server system 102 can execute optimization software 104 configured to construct one or more models 106 and use the models 106 to select production equipment for installation at a production location 116a. The production equipment can be selected based on the models 106 to optimize production of a physical component 120 at the production location 116a. The production equipment can be any type of physical machine, such as an electrical machine or a mechanical machine, that can produce the component 120.

More specifically, the system 100 can include any number of client devices 108a-b through which any number of entities 112a-b can interact with the server system 102. Examples of the client devices 108a-b can include desktop computers, laptop computers, tablets, and wearable devices such as smart watches. Examples of the entities 112a-b can include companies or users. The entities 112a-b can operate the client devices 108a-b to interact with the server system 102. For example, entity 112a can operate client device 108a to access a graphical user interface 110 provided by the optimization software 104. Through the graphical user interface 110, the entity 112a may be able to interact with one or more graphical interface elements to select a type of production location at which the production equipment is to be installed. There may be multiple different types of production locations at which the production equipment can be installed (e.g., deployed for use at the production location). For example, the entity 112a may want to install the production equipment at production location 116a, which may be of a different type than production location 116b. As one specific example, production location 116a may be a drive-thru location and production location 116b may be a coffee stand. The entity 112a can select a type of production location, for example from a pull-down menu or via another graphical interface element of the graphical user interface 110, at which the production equipment is to be installed. The optimization software 105 can receive the selection from the client device 108 via one or more networks 114, such as the Internet.

In response to receiving the selection, the optimization software 104 can determine a particular model, from among the models 106, that corresponds to the selected type of production location. Relationships between the models 106 and types of production locations can be stored in memory (e.g., cache memory) to assist in this determination. Each of the models 106 may correspond to a different type of production location than the other models 106. For example, a first model may correspond to a first type of production location and a second model may correspond to a second type of production location. The "type" of a production location may be a predesignated classification that depends on the production location's floorplan, service model, size, operations, or any combination of these. Each type of production location may be physically constructed according to certain design specifications that may be different from the other types of production locations.

In some examples, each model 106 can include a polynomial defining a curve that represents the cumulative consumption of the component 120 over a particular time window, such as one day. One example of such a model is shown in a graph 200 of FIG. 2. As shown, the graph 200 can include time along the X-axis and cumulative component consumption along the Y-axis for a drive-thru only location. The time window depicted in the graph 200 spans 24 hours, or one day. The model is the dashed curve corresponding to the polynomial $y=-0.0002x^3+0.0071x^2-0.0191x+0.309$. The graph 200 also shows other curves corresponding to $25^{th}$ percentile consumption, $75^{th}$ percentile consumption, $90^{th}$ percentile consumption, and mean consumption of the component at the drive-thru only location.

Continuing with FIG. 1, after determining a model 106 that corresponds to the selected type of production location, the optimization software 104 can generate a consumption profile 130 based on the model 106. The consumption profile 130 can include one or more consumption characteristics associated with consumption of the component 120 at the selected type of production location. Examples of the consumption characteristics can include a rate of change of consumption of the component 120 at the selected type of production location, the maximum rate of consumption of the component 120 at the selected type of production location, one or more times of day at which the maximum consumption rate occurs, the minimum rate of consumption of the component 120 at the selected type of production location, one or more times of day at which the minimum consumption rate occurs, the average rate of consumption of the component 120 at the selected type of production location, or any combination of these.

In some examples, the optimization software 104 can determine the rate of change in consumption by taking the first derivative of the model. If the model is a polynomial represented as $y(t)=At^3+Bt^2+Ct+D$, where the coefficients A, B, C, and D were previously derived during a model-generation process, then taking the first derivative can result in the rate equation: $r(t)=3At^2+2Bt+C$. This equation represents the rate of change of consumption at the particular type of production location. In some examples, the optimization software 104 can determine the time ($t_{max}$) at which the maximum rate of consumption occurs can be obtained by taking the second derivative of the model's polynomial and setting it equal to zero. If the model's polynomial is represented as $y(t)=At^3+Bt^2+Ct+D$, then taking the second derivative and setting it equal to zero can result in $t_{max}=B/3A$. In some examples, the optimization software 104 can determine the average consumption rate for the component using the integral $$\frac{1}{b-a} \times \int_a^b r(t)dt,$$

where a is the time at which the particular type of location opens, b is the time at which the particular type of location closes, and r(t) is the rate equation described above. Other techniques can be used to determine these or other consumption characteristics for inclusion in the consumption profile 130. The consumption characteristics in the consumption profile 130 can serve as criteria for identifying an appropriate piece of production equipment.

Having generated the consumption profile 130 for the particular type of production location, the optimization software 104 can select a piece of production equipment that meets one or more of the criteria in the consumption profile 130. Examples of the production equipment can include appliances such as ice makers, ovens, and mixers; molders such as injection molding machines, rotational molding machines, and extrusion molding machines; chemical mixing machines such as tumbler blenders, ribbon blenders, agitators, and emulsifiers; etc. The optimization software 104 can make this determination based on equipment profiles 132 corresponding to multiple pieces of production equipment. The equipment profiles 132 can describe the operational characteristics of different types of production equipment. Examples of the operational characteristics can include a maximum production rate of the component 120, a minimum production rate of the component 120, an average production rate of the component 120, or any combination of these. As one particular example, the equipment profiles 132 can describe different types of ice making machines, where type may have its own equipment profile indicating its unique operational characteristics. The optimization software 104 can select a type of ice making machine that meets one or more criteria set forth in the consumption profile 130. For example, the optimization software 104 can select a type of ice making machine that can produce the component 120 at a rate that is greater than or equal to the maximum consumption rate described in the consumption profile 130.

After selecting the appropriate piece of production equipment for the particular type of location, the optimization software 104 can execute one or more computing operations to facilitate the installation of the selected production equipment at the particular type of production location, such as production location 116a. One example of the computing operations can include updating the graphical user interface 110 of the client device 108a to display an identifier of the selected production equipment. The graphical user interface 110 may also be updated to display an image of the selected production equipment, some or all of the equipment profile 132 for the selected production equipment, installation instructions for the selected production equipment, or any combination of these. Based on this information, the entity 112a may physically install or assist in installing the selected production equipment at the selected type of production location. Installing the production equipment may include plugging the production equipment into an electrical outlet or another power source at the production location, physically affixing the production equipment to a surface of the production location, attaching fluid conduits to the production equipment, or any combination of these.

Another example of the computing operations can include notifying at least one other entity 112b of the selected production equipment, for example by transmitting an electronic communication to the client device 108b. The other entity 112b may be different from entity 112a as well as the operator of the server system 102. For example, the other entity 112b may be a construction or installation contractor, an individual at the production location, or another entity that can physically install or assist in installing the selected production equipment at the selected type of production location. In some examples, the optimization software 104 can generate a construction list 128 that includes the selected production equipment. The construction list 128 may be a list of physical devices to be installed at the production location. The optimization software 104 can transmit the construction list 128 to the other entity 112b for use in constructing, renovating, or otherwise modifying the production location to include the selected production equipment.

In the example shown in FIG. 1, the production location 116a can be the location at which the selected production equipment is installed. In this example, the selected production equipment may serve as primary production equipment 118 or secondary production equipment 124. Primary production equipment may be industrial-grade equipment that can serve as the main source for manufacturing a component at a production location. Secondary production equipment may be used to fill a production gap, for example if the primary production equipment is unable to produce a sufficient amount of the component 120 to meet the needs of the production location. As one particular example, the primary production equipment 118 may be an industrial ice machine. If the ice machine is insufficiently sized to produce enough ice to satisfy demand at peak times by the production location 116a, secondary production equipment 124 may be installed to fill the gap. The secondary production equipment 124 may be a smaller-sized ice machine that can output a sufficient amount of ice to fill the production deficit.

The component 120 can be used to create one or more products 126 at the production location 116. For example, the ice from the ice machines can be used as an ingredient to produce beverages or foods at the production location 116a. Additionally or alternatively, the component 120 can be provided as an input to other production equipment 134, as represented by the dashed arrow in FIG. 1. The other production equipment 134 can also be installed at the production location 116a for producing the products 126 using the component 120. Examples of the other production equipment 134 can include ovens, mixers (e.g., blenders), assembly lines, etc. Once created, the products 126 may be provided to visitors of the production location 116 or transmitted to other locations for distribution.

In some examples, the server system 102 can further optimize component manufacturing after the production equipment (e.g., the primary production equipment 118 or the secondary production equipment 124) is installed at the production location 116a. For example, the optimization software 104 can analyze the model 106 associated with the production location 116a to identify a peak consumption time at which the component 120 is most consumed. The optimization software 104 can also analyze the model 106 to identify an average consumption time at which the component 120 is consumed an average amount. The optimization software 104 may further analyze the model 106 to identify a low consumption time at which the component 120 is least consumed. A low consumption time can be a time at which consumption of the component 120 is considerably below an average consumption level. The optimization software 104 can then control the primary production equipment 118, the secondary production equipment 124, or both based on that information.

For example, the optimization software 104 can transmit commands via the network 114 to the primary production equipment 118, the secondary production equipment 124, or both to increase their production of the component 120 near peak consumption times. The optimization software 104 can also transmit commands via the network 114 to the primary production equipment 118, the secondary production equipment 124, or both to decrease their production of the component 120 near low consumption times. The optimization software 104 can further transmit commands via the network 114 to the primary production equipment 118, the secondary production equipment 124, or both to modify their production of the component 120 to optimize it for average consumption times. In this way, the optimization software 104 can automatically and dynamically adjust the operational settings of the primary production equipment 118 and the secondary production equipment 124 to balance their output against needs and energy consumption.

In some examples, the production equipment can include sensor units 122a-c. For example, the primary production equipment 118, secondary production equipment 124, and the other production equipment 134 can include sensors units 122a-c. The sensor units 122a-c can each include one or more sensors configured to measure various parameters and transmit corresponding sensor signals to the server system 102 via the network 114. Examples of the sensors can include temperature sensors, weight sensors, accelerometers, water sensors, cameras, global positioning system (GPS) units, microphones, flow meters, fuel sensors, light sensors, pressure sensors, inclinometers, speed sensors, proximity sensors, depth sensors, level sensors, rotation sensors, or any combination of these. The server system 102 can receive the sensor signals from the sensor units 122a-c and use their measurements to further optimize component manufacturing.

For example, the optimization software 104 may receive a sensor signal from a sensor unit 122a of the primary production equipment 118. The sensor signal may indicate an available quantity of the component 120 or rate of production of the component 120 at a given time of day. Based on the sensor signal, the optimization software 104 can detect an event. For example, the optimization software 104 can determine that the available quantity or production rate is below a predefined threshold. The predefined threshold may be, for example, a usual consumption rate for that time of day as indicated by the model 106. The reason for this event may be due to a defect in the production equipment, power loss for a period of time, insufficient power supply to the production equipment, or some other issue or anomaly, which may not be readily ascertainable based on the equipment profiles 132. In response to detecting the event, the optimization software 104 can automatically control the primary production equipment 118, the secondary production equipment 124, or both to boost production. This may help account for the deficit and ensure that the production location 116a has a sufficient amount of the component to meet its needs.

While the example shown in FIG. 1 involves a client-server arrangement, other examples may involve other arrangements. For instance, the optimization software 104 may alternatively be executed on the client device 108a. In some such examples, the optimization software 104 may be a native application or other executable that is run directly on the client device 108a. Other examples may also involve more components, fewer components, different components, or a different arrangement of components than is shown in FIG. 1. For instance, although the optimization software 104 is represented as a single box in FIG. 1 for simplicity, it will be appreciated that the optimization software 104 can include any number and combination of software modules.

Figure 3:
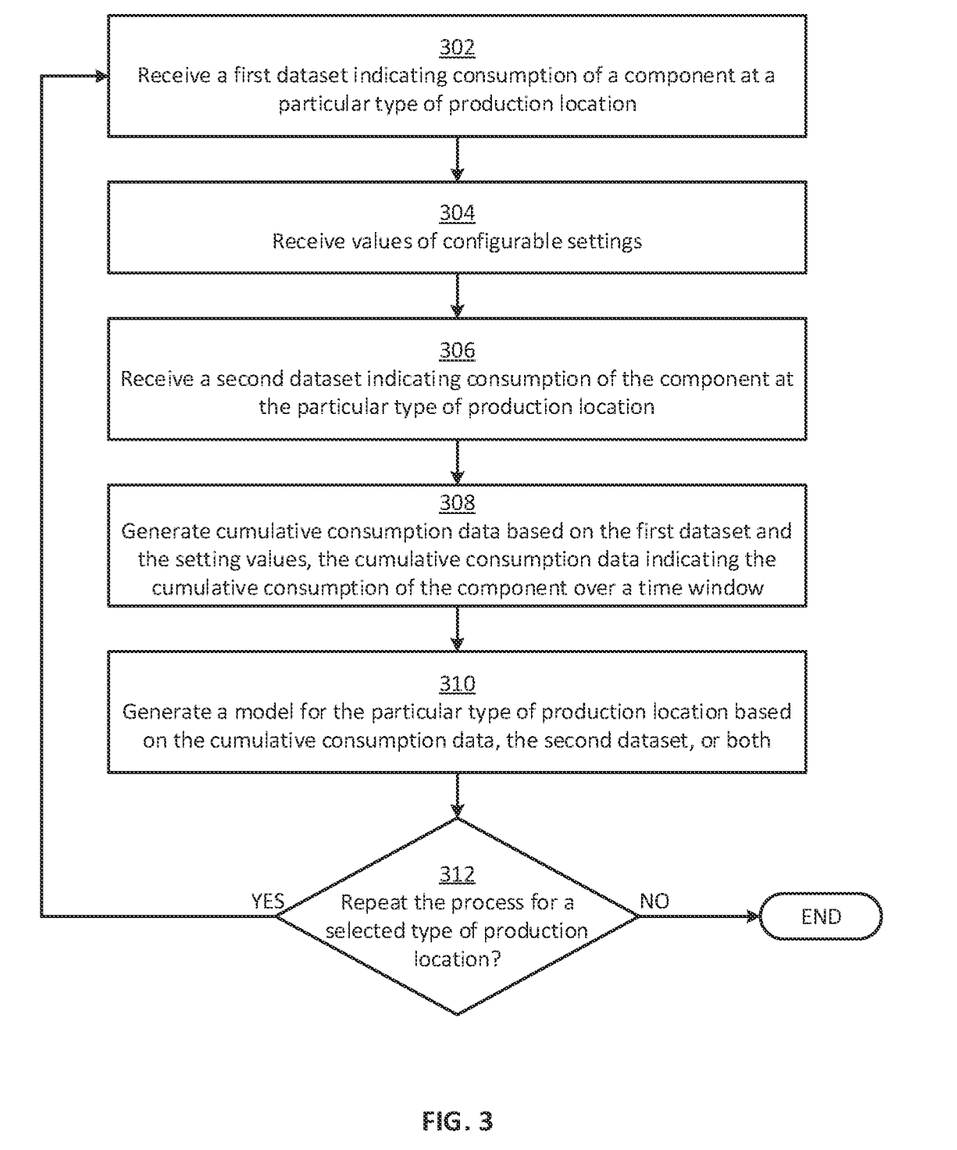
FIG. 3 is a flowchart of an example of a process for generating a model according to some aspects of the present disclosure.

FIG. 3 is a flowchart of an example of a process for generating a model 106 according to some aspects of the present disclosure. Although the process is described below with reference to the optimization software 104 of FIG. 1, the process can be implemented by other software located on or off of the server system 102.

In block 302, the optimization software 104 receives a first dataset indicating consumption of a component 120 at a particular type of production location. Examples of the component 120 can include an electronic component, such as an integrated circuit (IC) chip, transistor, or resistor; a food or beverage ingredient, such as ice, syrup, dough, or frosting; a chemical composition, such as a mixture of liquid chemicals or powder chemicals; or a mechanical component, such as a fastener, toy part, or tire.

The first dataset can indicate consumption of the component 120 in a first time increment. For example, the first dataset can indicate the consumption of the component 120 by a single production location in half-hour increments over the course of a prior time window. In this example, the first dataset would include 2×24 hours=48 data points per day, for as many days as there are in the time window. If the time window is one year, this would result in 17,520 total data points. Other examples can include consumption information from multiple production locations, in which case the first dataset would include even more data points.

The first dataset can be derived from consumption information provided by one or more production locations of the particular type. For example, a dozen production locations of the particular type can provide consumption information about the consumption of the component 120 in half-hour increments over the prior time window (e.g., the previous year). This consumption information can be collected and aggregated to generate the first dataset.

The optimization software 104 can receive the first dataset from any suitable source. For example, the optimization software 104 can automatically generate the first dataset by communicating via one or more networks 114 with one or more computer systems of one or more production locations of the particular type. Each of the computer systems can provide the relevant consumption information to the optimization software 104, which can aggregate and format (e.g., normalize) the consumption information according to the first time increment. As another example, the optimization software 104 can receive the first dataset from a database or another computer system.

In block 304, the optimization software 104 receives values for configurable settings. The configurable settings can be variables that can be adjusted to impact or improve the accuracy of the resulting model 106. Examples of configurable settings can include a loss rate, a remake rate, a decay rate, an error rate, and an override. The loss rate may be a rate at which the component 120 is misplaced or lost during the production process. The remake rate may be a rate at which the component 120 is used to remake a product because the original product failed to meet requested specifications. The decay rate may be a rate at which a physical quality of the component 120 decays over time, for example to the point at which the component 120 becomes unusable for an intended purpose. In the context of ice, the decay rate may be the rate at which the ice melts over time. The error rate may be a rate at which errors are made in the production of the component 120, which can render the produced component unsatisfactory for an intended purpose. An override can be a manual override of at least a portion of the first dataset with one or more replacement values, for example because the first dataset fails to account for an event such as a seasonal shift or promotion.

As one particular example, the production location may produce beverages that include ice, which can serve as the component 120. It can be assumed that there will be certain circumstances in which beverages will need to be remade, for example due to errors or other complications. It can also be assumed that some of the ice will melt or evaporate over time, even if it is stored in a cold location such as a freezer. These assumptions can correspond to configurable settings that can be customized by a user. For example, a first configurable setting can be a beverage remake rate and a second configurable setting can be an ice melt rate. An example of the beverage remake rate may be 5%, meaning that 5% of the total number of beverages produced need to be remade. An example of the ice melt rate may be 8%, meaning that 8% of the total ice produced in a given day may melt before it can be used. A user may be able to input these setting values to help configure the model.

In some examples, the optimization software 104 can receive the values for the configurable settings from a user via a graphical user interface, such as graphical user interface 110. For example, the user can input the values via one or more graphical interface elements of the graphical user interface. Additionally or alternatively, the optimization software 104 can receive at least some of the values of the configurable settings from a predefined configuration file, which may have been drafted by a model developer or another entity.

In block 306, the optimization software 104 receives a second dataset indicating consumption of a component 120 at the particular type of production location. The second dataset can indicate consumption of the component 120 in a second time increment that is different than the first time increment. For example, the second dataset can indicate the consumption of the component 120 per day (e.g., in one-day increments) by a single production location over the course of a prior time window. In this example, the second dataset would include one data point-per-day, for as many days as there are in the time window. If the time window is one year, this can result in 365 total data points. Other examples can include consumption information from multiple production locations, in which case the second dataset can include more data points.

The second dataset can be derived from consumption information provided by one or more production locations of the particular type. For example, a dozen production locations of the particular type can provide consumption information about the consumption of the component 120 in daily increments over the prior time window (e.g., the previous year). This consumption information can be parsed and aggregated to generate the second dataset. For example, each production location can provide a respective set of data points indicating its consumption of the component over the prior time window. If the prior time window spans one year, this would result in 365 total data points per production location. In this example, the maximum values can be selected from among the 365 data points received from each production location. The maximum values can then be aggregated together to create the second dataset. As a result, the second dataset would include only a limited subset of the data points received from each production location in this example.

The optimization software 104 can receive the second dataset from any suitable source. For example, the optimization software 104 can automatically generate the second dataset by communicating via one or more networks 114 with one or more computer systems of one or more production locations of the particular type. Each of the computer systems can provide the relevant consumption information to the optimization software 104, which can select, aggregate, and/or reformat (e.g., normalize) the consumption information. For example, the optimization software 104 can select the maximum values from the consumption information received from each of the production locations and aggregate the maximum values together to generate the second dataset. As another example, the optimization software 104 can receive the second dataset from a database or another computer system.

In block 308, the optimization software 104 generates cumulative consumption data based on the first dataset, the setting values, the second dataset, or any combination of these. The cumulative consumption data can indicate the cumulative consumption of the component over a selected time window, such as one day.

Figure 2:
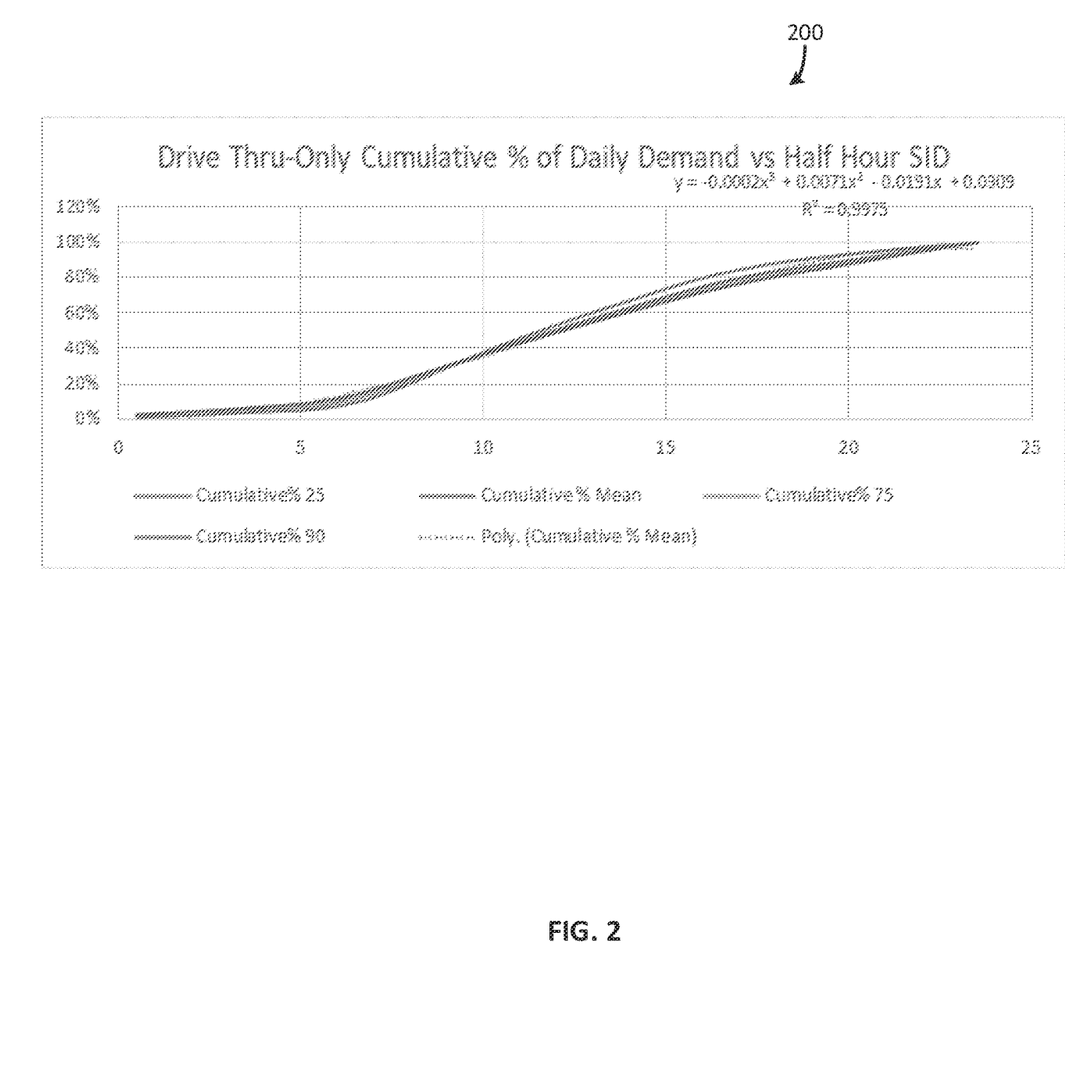
FIG. 2 is a graph of an example of a model according to some aspects of the present disclosure.

In some examples, the cumulative consumption can be a range with a starting value of 0% and an ending value of 100%, where the consumption increases from the starting value at time to to the ending value at time tn, which is the end of the selected time window. An example of the cumulative consumption data can be the data points plotted relative to a 24-hour period in FIG. 2. As shown in FIG. 2, each data point represents a cumulative consumption value that is determined by dividing the running component consumption up to that point by the total component consumption for the entire day. The total component consumption for the entire day can be determined based on the second dataset. For example, the optimization software 104 can determine a mean of the daily values in the second dataset and use the mean as the total component consumption per day.

The setting values can also be taken into account when generating the cumulative consumption data. For example, the cumulative consumption data can be adjusted to account for a loss rate, a remake rate, a decay rate, an error rate, an override, or any combination of these. For instance, the cumulative consumption data can be increased based on a beverage remake rate of 5% and an ice melt rate of 8%, to account for those factors. Existing models and human experts may fail to consider these factors in their computations, yielding suboptimal results. Taking these and other factors into consideration can produce more accurate results.

In block 310, the optimization software 104 generates a model 106 based on the cumulative consumption data, the first dataset, the second dataset, or any combination of these. For example, the optimization software 104 can execute a least squares method, such as a Levenberg-Marquardt algorithm, to estimate polynomial parameters for a polynomial based on the cumulative consumption data, where the model 106 includes the polynomial. If the polynomial is a cubic polynomial, it can be represented in the form: $y(t)=At^3+Bt^2+Ct+D$. The least squares method can be used to minimize the sum of the squared errors and thereby find the best fitting curve to the data.

In some examples, the model 106 can be a machine-learning model, such as a neural network or ensemble of models. In some such examples, the optimization software 104 can generate the model 106 at least in part by training the model using supervised or unsupervised learning techniques, which can transform the model 106 from an untrained state to a trained state. The model 106 can be trained based on the cumulative consumption data, the first dataset, the second dataset, or any combination of these. For example, the optimization software 104 may execute hundreds or thousands of training iterations to tune the model 106 based on the cumulative consumption data. Once tuned, the model 106 may be able to accurately predict consumption of the component at a future point in time or otherwise provide valuable consumption information, which can be used to select an appropriate piece of production equipment for the particular type of production location.

In block 312, the optimization software 104 determines whether the above process is to be repeated for a selected type of production location. The selected type of production location may be another type of production location or the same type of production location for which the model 106 was already generated. For example, the above process can be iterated for each type of production location to generate a unique model for that type of production location. As one particular example involving a coffee producer, the following polynomial coefficients can be determined for various types of production locations:

TABLE 1

Model Coefficients For Different Types of Production Locations

| Type of Production Location | A | B | C | D |
|---|---|---|---|---|
| Roastery | −0.0001231 | 0.0005234 | −0.9000000 | 0.1235320 |
| Reserve Store | −0.0001232 | 0.0134500 | −0.3456820 | 0.2346530 |
| Reserve Bar | −0.0002345 | 0.0112345 | −0.1235345 | −0.9345330 |
| Pickup | −0.0005341 | 0.4535123 | 0.01234561 | −0.2314000 |
| Kiosk | −0.0001563 | 0.0234626 | −0.1235775 | 0.7683000 |
| Express | 0.0004561 | −0.0123145 | 0.2347867 | −4.2346000 |
| Drive Thru Only | −0.0001134 | 0.0234578 | −0.0089657 | 0.0324000 |
| Drive Thru | −0.0002645 | 0.0234134 | −0.6453000 | 0.3420000 |
| Coffee Stand | −0.0007556 | 0.0768454 | −0.2345200 | 0.9990000 |
| Cafe | −0.0001124 | 0.4357892 | 0.0324521 | 0.1230000 |

In some examples, the optimization software 314 may receive updated versions of the first dataset and the second dataset subsequent to generating the model 106. The updated versions may be based on additional or different consumption data gathered from one or more production locations of the particular type. For example, the original versions of the first dataset and the second dataset may have been generated based on consumption data collected from one or more production locations in relation to a first time window. As time progresses, additional consumption information associated with a second time window may be added to the first dataset and the second dataset, resulting in updated versions of the first dataset and the second dataset. The second window may be subsequent to the first time window. In some such examples, the process can return to block 302 and iterate to update the model 106 based on the updated versions of the first dataset and the second dataset. Updating the model 106 may involve determining new coefficients for the model 106. By updating the model 106 based on larger or different datasets, the accuracy of the model 106 can be improved. This process can be automatically repeated in response to a predefined event (e.g., the passage of a preset time period), so that the model 106 can be continually improved over time.

As noted earlier, in some examples the optimization software 314 can generate a respective consumption profile 130 for each type of production location based on the corresponding model 106. The consumption profile 130 can include one or more consumption characteristics, such as an average consumption rate, a time of day at which the maximum consumption rate occurs, and the maximum consumption rate. Examples of the consumption profiles 130 are shown below, where these consumption profiles 130 are related to the coffee producer example described above:

TABLE 2

Consumption Profiles For Different Types of Production Locations

| Type of Production Location | Total Number of Hours Open/Day | Avg Consumption Rate (% total consumption/hr) | Time of Max Consumption Rate (hr of day) | Max Consumption Rate (% total consumption/hr) |
|---|---|---|---|---|
| Roastery | 17.5 | 2.5% | 12.1 | 10.3% |
| Reserve Store | 17.5 | 3.3% | 16.2 | 6.2% |
| Reserve Bar | 18.5 | 7.2% | 5.4 | 6.3% |
| Pickup | 15.5 | 2.6% | 7.4 | 4.6% |
| Kiosk | 18.5 | 9.2% | 17.2 | 5.3% |
| Express | 11 | 3.1% | 14.3 | 3.1% |
| Drive Thru Only | 24 | 4.7% | 15.1 | 8.2% |
| Drive Thru | 24 | 5.3% | 10.2 | 7.4% |
| Coffee Stand | 5 | 6.2% | 13.2 | 6.3% |
| Cafe | 24 | 7.0% | 14.5 | 9.2% |

The optimization software 104 can use a consumption profile 130 for a given type of production location to select an appropriately configured (e.g., sized) piece of production equipment to handle the maximum consumption rate, the average consumption rate, or both. The optimization software 104 may also automatically control a piece of production equipment (e.g., production equipment 118) based on the consumption profile 130, for example to increase the output rate of the production equipment at the Roastery to at least 10.3% at hour number 14 each day, so that a sufficient amount of the component 120 is produced to satisfy this peak consumption level.

Figure 4:
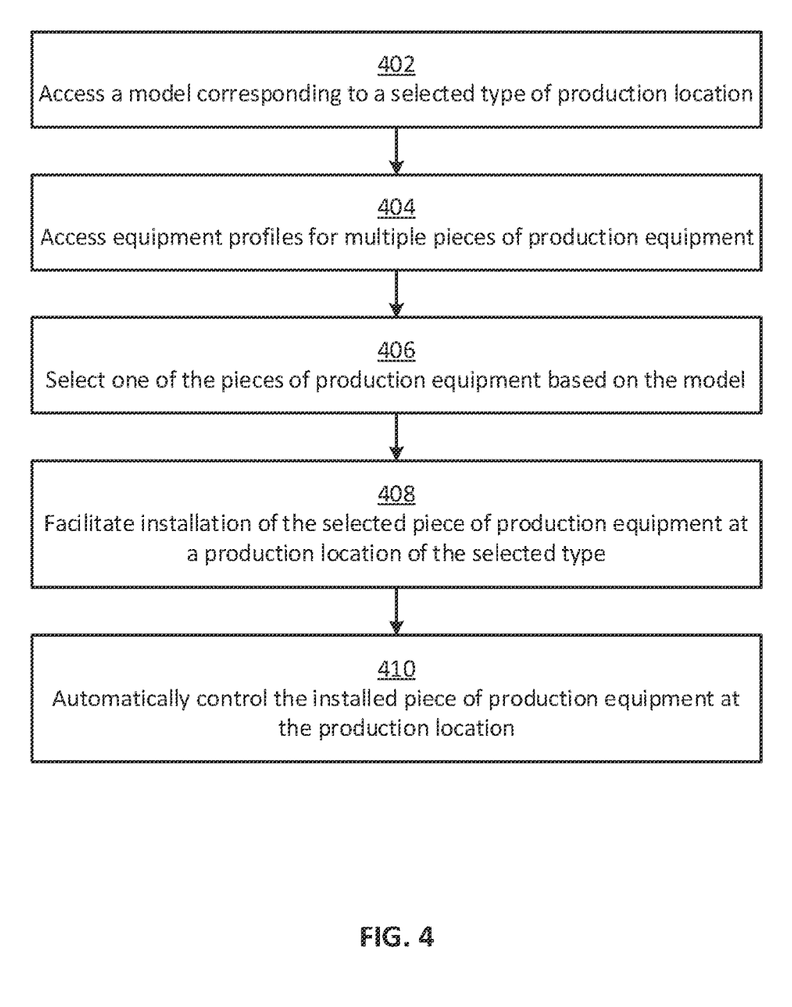
FIG. 4 is a flowchart of an example of a process for selecting and automatically controlling a piece of production equipment according to some aspects of the present disclosure.

FIG. 4 is a flowchart of an example of a process for selecting and automatically controlling a piece of production equipment according to some aspects of the present disclosure. Although the process is described below with reference to the optimization software 104 of FIG. 1, the process can be implemented by other software located on or off of the server system 102.

In block 402, the optimization software 104 accesses a model 106 corresponding to a selected type of production location. For example, the optimization software 104 can access a stored mapping that correlates models 106 to types of production locations to determine which of the models 106 corresponds to the selected type of production location. The type of production location can be selected by a user, for example via the graphical user interface 110 of FIG. 1.

In block 404, the optimization software 104 accesses equipment profiles 132 for multiple pieces of production equipment that may have the same primary purpose (e.g., function), for example to produce ice. Each equipment profile can correspond to a single piece of production equipment. Each piece of production equipment may be of a different type (e.g., make or model) than the other pieces of production equipment. The equipment profiles 132 may have been progenerated based on manufacturer data about the pieces of production equipment.

In block 406, the optimization software 104 selects one of the pieces of production equipment based on the selected model 106. For example, the optimization software 104 can compute a consumption profile 130 based on the model 106, where the consumption profile 130 can include one or more consumption characteristics associated with the particular type of production location. Examples of such consumption characteristics can include average consumption rate, a maximum consumption rate, and a time of day at which the maximum consumption rate occurs. Other examples of consumption characteristics, and examples of techniques for computing the consumption characteristics, are described above.

In block 408, the optimization software 104 facilitates installation of the selected piece of production equipment at a production location of the selected type. For example, the optimization software 104 can generate a graphical user interface 110 that displays an identifier of the selected production equipment. The graphical user interface 110 may also display other information about the selected production equipment. Based on this information, the entity 112a may physically install or assist in installing the selected production equipment at the selected type of production location. As another example, the optimization software 104 can transmit a notification to one or more entities indicating the selected production equipment. The one or more entities may include personnel, contractors, or technicians capable of installing the selected production equipment at the production location. As still another example, the optimization software 104 can generate a construction list 128 that includes the selected production equipment. The construction list 128 may be a list of physical machines to be installed at the production location. The optimization software 104 can transmit the construction list 128 to one or more entities for use in deploying the selected production equipment at the production location.

In block 410, the optimization software 104 automatically controls the installed piece of production equipment at the production location. In some examples, the optimization software 104 may automatically control the production equipment based on the model 106, for example to change the equipment's rate of production throughout the day. This may involve transmitting commands to the production equipment at different times of day, where the commands may cause the production equipment to change its operational settings. For example, the optimization software 104 can use the model 106 to predict that the production location will likely have a first consumption rate associated with the component 120 at a first time of day and a second consumption rate associated with the component 120 at a second time of day. So, the optimization software 104 can command the production equipment to operate at a first production rate at the first time of day and a second production rate at the second time of day, where the second production rate is different from the first production rate. The first production rate can be selected to be greater than or equal to the first consumption rate, and the second production rate can be selected to be greater than or equal to the second consumption rate. This can help ensure that the production equipment is producing a sufficient amount of the component 120 to meet the changing demand of the production location throughout the day.

Additionally or alternatively, the optimization software 104 can automatically control the production equipment based on sensor signals from one or more sensors of one or more sensor units 122a-c. For example, if the sensor signals indicate that the energy consumption of the production equipment is too high (e.g., it exceeds a predefined threshold), the optimization software 104 can reduce the production rate of the production equipment to help conserve energy. In some examples, the optimization software 104 is intelligent enough to use the model 106 to balance component production against energy consumption for maximizing energy efficiency.

Additionally or alternatively, the optimization software 104 can automatically control the production equipment based on a predictive model that is different from the other models 106. One example of the predictive model can be forecasting model, such as an exponential smoothing model (ESM) or an autoregressive integrated moving average (ARIMA) model. The predictive model can be configured to predict consumption of the component 120 over a future timespan at the production location. The predictive model may be trained based on training data (e.g., time series data) indicating historical consumption of the component 120 at one or more production locations over a previous time period. Once trained, the optimization software 104 can use the predictive model to predict a consumption rate of the component 120 at a future point in time at the production location. The optimization software 104 can then automatically control the production equipment to operate at a production rate that is greater than or equal to the predicted consumption rate.

Figure 5:
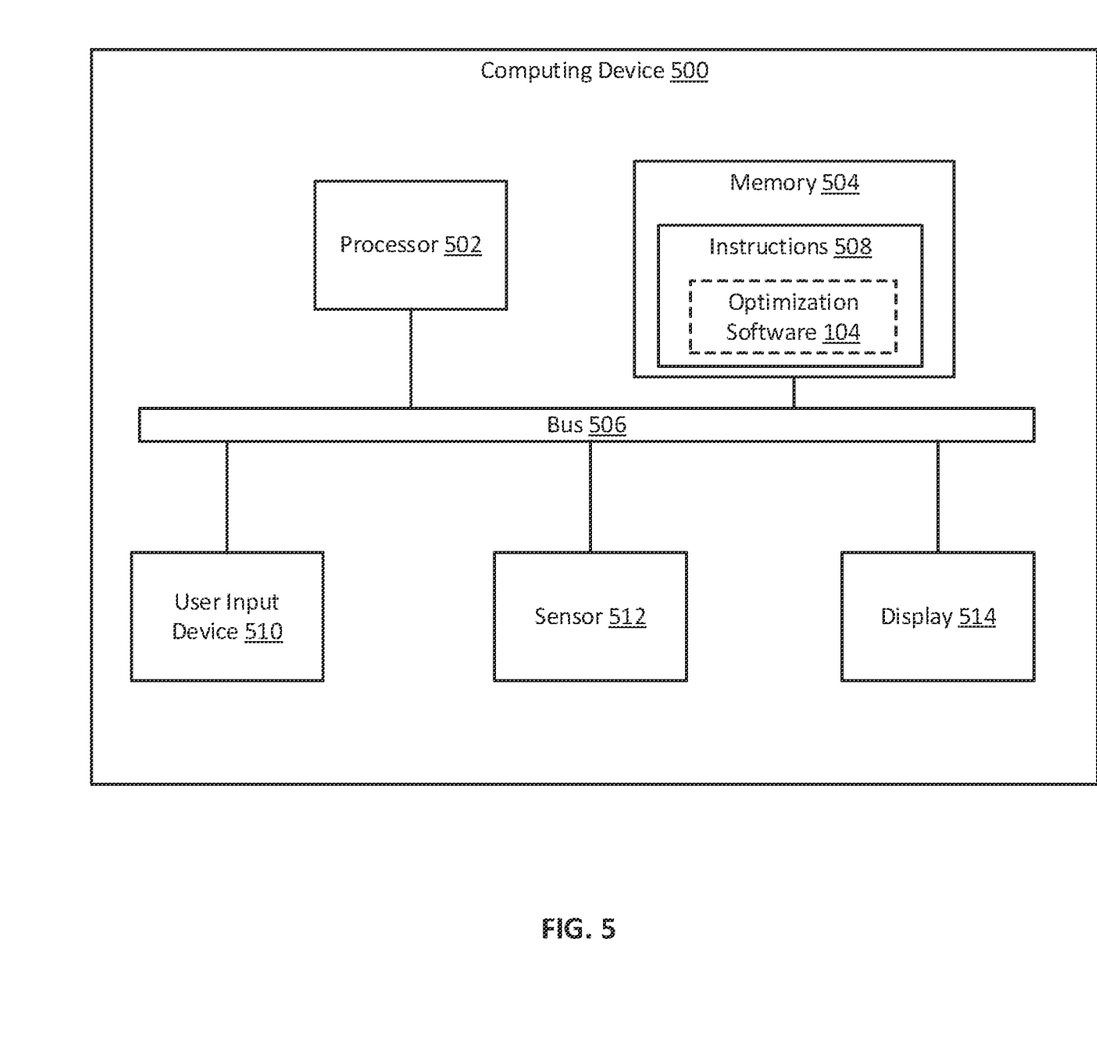
FIG. 5 is a block diagram of an example of a computing device usable to implement some aspects of the present disclosure.

FIG. 5 is a block diagram of an example of a computing device 500 usable to implement some aspects of the present disclosure. The computing device 500 can correspond to the server system 102 or client device 108a of FIG. 1. Examples of the computing device 500 can include a server, a desktop computer, a laptop computer, a tablet, a smart phone, or a wearable device.

The computing device 500 includes a processor 502 communicatively coupled to a memory 504 by a bus 506. The processor 502 can include one processor or multiple processors. Examples of the processor 502 can include a Field-Programmable Gate Array (FPGA), an application-specific integrated circuit (ASIC), and a microprocessor. The processor 502 can execute instructions 508 stored in the memory 504 to perform operations. The instructions 508 may include processor-specific instructions generated by a compiler or an interpreter from code written in any suitable computer-programming language, such as C, C++, C#, Java, or Python.

The memory 504 can include one memory device or multiple memory devices. The memory 504 can be volatile or non-volatile (e.g., it can retain stored information when powered off). Examples of the memory 504 include electrically erasable and programmable read-only memory (EEPROM), flash memory, or cache memory. At least some of the memory 504 includes a non-transitory computer-readable medium from which the processor 502 can read instructions 508. A computer-readable medium can include electronic, optical, magnetic, or other storage devices capable of providing the processor 502 with the instructions 508 or other program code. Examples of a computer-readable mediums include magnetic disks, memory chips, ROM, random-access memory (RAM), an ASIC, a configured processor, and optical storage.

In some examples, the instructions 508 can include the optimization software 104 of FIG. 1. The optimization software 104 may be executable by the processor 502 for causing the processor 502 to perform any amount and combination of the functionality described herein. The optimization software 104 may also be executable by the processor 502 to perform more functionality, less functionality, or different functionality than is described herein.

The computing device 500 also includes input components. One example of an input component can include the user input device 510, which may include one user input device or multiple user input devices. Examples of such user input devices can include a mouse, a keyboard, a touchpad, and a touch-screen display. Another example of an input component can include the sensor 512, which may include one sensor or multiple sensors. Examples of such sensors can include a GPS unit, a gyroscope, an accelerometer, an inclinometer, and a camera.

The computing device 500 further includes output components. One example of an output component can include the display 514, which may include one display or multiple displays. Examples of such displays can include a liquid crystal display (LCD) or a light-emitting diode (LED) display. The computing device 500 may also include an audio output component such as a speaker, a haptic output component such as a haptic actuator, or another type of output component. But for simplicity, these other output components are not shown in FIG. 5.

While FIG. 5 depicts the components (e.g., processor 502, memory 504, and display 514) as being internal to a single housing, in other examples the components may be distributed and in wired or wireless communication with one another. For example, the display 514 may be a computer monitor that is separate from and in communication with the computing device 500 that performs the main processing. And although FIG. 5 depicts a certain number and arrangement of components, this is for illustrative purposes and not intended to be limiting. Other examples can include more components, fewer components, different components, or a different arrangement of the components shown in FIG. 5.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system comprising:
   one or more processors; and
   one or more memories including instructions that are executable by the one or more processors to:
   access a plurality of models stored in memory, each model of the plurality of models corresponding to a respective type of production location among a plurality of types of production locations and indicating consumption rates of a component over a particular time window at the respective type of production location;
   select a particular model, from among the plurality of models, that is associated with a particular type of production location selected by a user;
   select a particular type of production equipment, from among a plurality of candidate types of the production equipment, based on the particular model; and
   execute one or more computing operations configured to facilitate deployment of the particular type of production equipment at the particular type of production location.

2. The system of claim 1, wherein the production equipment is an ice making machine and the component is ice.

3. The system of claim 1, wherein the one or more memories further include instructions that are executable by the one or more processors to:
   receive a first dataset indicating consumption of the component by a plurality of production locations of a particular type;
   generate cumulative consumption data based on the first dataset, the cumulative consumption data indicating cumulative consumption of the component over the particular time window; and
   automatically select coefficients for a polynomial by applying a least squares algorithm to the cumulative consumption data, wherein the polynomial serves as a model for the particular type of production location, and wherein the polynomial is defined as $y(t) = At^3 + Bt^2 + Ct + D$ with A, B, C, and D being the selected coefficients.

4. The system of claim 1, wherein the one or more memories further include instructions that are executable by the one or more processors to generate the plurality of models based on a plurality of configurable setting values including a remake rate and a decay rate.

5. The system of claim 1, wherein the one or more memories further include instructions that are executable by the one or more processors to:
   receive sensor data from a piece of production equipment located at a production location, the sensor data indicating a production rate of the component by the production equipment at a given point in time;
   determine that the production rate is below a predetermined threshold, the predetermined threshold being derived from the particular model; and
   in response to determining that the production rate is below the predetermined threshold, automatically adjust the production rate of the production equipment by transmitting commands to the production equipment via one or more networks.

6. The system of claim 1, wherein the one or more memories further include instructions that are executable by the one or more processors to select the particular type of production equipment from among the plurality of candidate types of the production equipment by:
   for each respective type of production equipment among the plurality of candidate types of the production equipment:
   accessing an equipment profile, among a plurality of equipment profiles, corresponding to the respective type of production equipment; and
   determining whether the equipment profile indicates that the respective type of production equipment can accommodate a maximum consumption rate of the component derived from the particular model.

7. A method comprising:
   accessing, by one or more processors, a plurality of models stored in memory, each model of the plurality of models corresponding to a respective type of production location among a plurality of types of production locations and indicating consumption rates of a component over a particular time window at the respective type of production location;
   selecting, by the one or more processors, a particular model, from among the plurality of models, that is associated with a particular type of production location selected by a user;
   selecting, by the one or more processors and based on the particular model, a particular type of production equipment, from among a plurality of candidate types of the production equipment; and
   executing, by the one or more processors, one or more computing operations configured to facilitate deployment of the particular type of production equipment at the particular type of production location.

8. The method of claim 7, wherein the production equipment is an ice making machine and the component is ice.

9. The method of claim 7, further comprising:
receiving a first dataset indicating consumption of the component by a plurality of production locations of a particular type;
generating cumulative consumption data based on the first dataset, the cumulative consumption data indicating cumulative consumption of the component over the particular time window; and
automatically selecting coefficients for a polynomial by applying a least squares algorithm to the cumulative consumption data, wherein the polynomial serves as a model for the particular type of production location, and wherein the polynomial is defined as $y(t) = At^3 + Bt^2 + Ct + D$ with A, B, C, and D being the selected coefficients.

10. The method of claim 7, further comprising generating the plurality of models based on a plurality of configurable setting values including a remake rate and a decay rate.

11. The method of claim 7, further comprising:
receiving sensor data from a piece of production equipment located at a production location, the sensor data indicating a production rate of the component by the production equipment at a given point in time;
determining that the production rate is below a predetermined threshold, the predetermined threshold being derived from the particular model; and
in response to determining that the production rate is below the predetermined threshold, automatically adjusting the production rate of the production equipment by transmitting commands to the production equipment via one or more networks.

12. The method of claim 7, further comprising selecting the particular type of production equipment from among the plurality of candidate types of the production equipment by:
for each respective type of production equipment among the plurality of candidate types of the production equipment:
accessing an equipment profile, among a plurality of equipment profiles, corresponding to the respective type of production equipment; and
determining whether the equipment profile indicates that the respective type of production equipment can accommodate a maximum consumption rate of the component derived from the particular model.

13. A non-transitory computer-readable medium including program code that is executable by one or more processors for causing the one or more processors to:
access a plurality of models stored in memory, each model of the plurality of models corresponding to a respective type of production location among a plurality of types of production locations and indicating consumption rates of a component over a particular time window at the respective type of production location;
select a particular model, from among the plurality of models, that is associated with a particular type of production location selected by a user;
select a particular type of production equipment, from among a plurality of candidate types of the production equipment, based on the particular model; and
execute one or more computing operations configured to facilitate deployment of the particular type of production equipment at the particular type of production location.

14. The non-transitory computer-readable medium of claim 13, wherein the production equipment is an ice making machine and the component is ice.

15. The non-transitory computer-readable medium of claim 13, further including program code that is executable by the one or more processors for causing the one or more processors to:
receive a first dataset indicating consumption of the component by a plurality of production locations of a particular type;
generate cumulative consumption data based on the first dataset, the cumulative consumption data indicating cumulative consumption of the component over the particular time window; and
automatically select coefficients for a polynomial by applying a least squares algorithm to the cumulative consumption data, wherein the polynomial serves as a model for the particular type of production location, and wherein the polynomial is defined as $y(t) = At^3 + Bt^2 + Ct + D$ with A, B, C, and D being the selected coefficients.

16. The non-transitory computer-readable medium of claim 13, further including program code that is executable by the one or more processors for causing the one or more processors to:
generate the plurality of models based on a plurality of configurable setting values including a remake rate and a decay rate.

17. The non-transitory computer-readable medium of claim 13, further including program code that is executable by the one or more processors for causing the one or more processors to select the particular type of production equipment from among the plurality of candidate types of the production equipment by:
for each respective type of production equipment among the plurality of candidate types of the production equipment:
accessing an equipment profile, among a plurality of equipment profiles, corresponding to the respective type of production equipment; and
determining whether the equipment profile indicates that the respective type of production equipment can accommodate a maximum consumption rate of the component derived from the particular model.

* * * * *